United States Patent [19]

Norling et al.

[11] Patent Number: 4,485,271
[45] Date of Patent: Nov. 27, 1984

[54] REMOTELY ACTUABLE LINE DISCONNECT DEVICE

[75] Inventors: Thomas B. Norling, Kendall Park; Joseph H. Polkowski, Lakewood; Jeffrey A. Poulsen, Fords; Daniel E. Robinson, Metuchen, all of N.J.

[73] Assignee: GK Technologies, Incorporated, Greenwich, Conn.

[21] Appl. No.: 403,569

[22] Filed: Jul. 30, 1982

[51] Int. Cl.$^3$ .................. H04B 3/46; H04M 3/22
[52] U.S. Cl. .................. 179/19; 179/81 R; 179/175.3 R
[58] Field of Search .......... 179/19, 27 G, 175.3 R, 179/175.3 F, 81 R; 340/825.06, 825.5

[56] References Cited

U.S. PATENT DOCUMENTS 4,126,771 11/1978 Proctor et al. .......... 179/175.3 R
4,143,250 3/1979 Simokat .............. 179/175.3 R
4,396,809 8/1983 Brunssen ............. 179/175.3 F

OTHER PUBLICATIONS

Telephone Station Isolation Device, Model DTA-103, Product Brochure, Del-Tronics Associates, Inc., Jan. 1976.

Primary Examiner—Thomas W. Brown
Attorney, Agent, or Firm—Hopgood, Calimafde, Kalil, Blaustein & Judlowe

[57] ABSTRACT

A disconnecting device is inserted in a two-wire communication loop near the far end thereof. The device contains a latching winding of a latching relay which winding is inserted in series with one side of the loop. The winding controls two normally closed contact pairs, one pair being inserted in series with each side of the loop to disconnect a far end telephone or the like when the winding is energized. A shunt diode and capacitor prevent activation of the latching winding by normal battery and signal current. Reverse polarity voltage of greater value than normal battery will activate the latching winding and effect far end disconnection. A reset winding of the relay is connected in series with a diac, a diode, a time constant resistor and a normally open pair of contacts of the latching relay, across the loop. Each of the normally closed contact pairs is shunted by a resistor to permit current flow past the contacts when open. A capacitor storage and timing circuit is connected with the reset winding of the relay to accumulate sufficient voltage when normal battery polarity and potential is restored to cause the diac to conduct and the relay to reset. The impedances are related so that a disconnection cannot be achieved when the telephone is in the ON-HOOK mode and there is no fault in the loop. Reconnection cannot occur while the telephone is OFF-HOOK.

12 Claims, 1 Drawing Figure

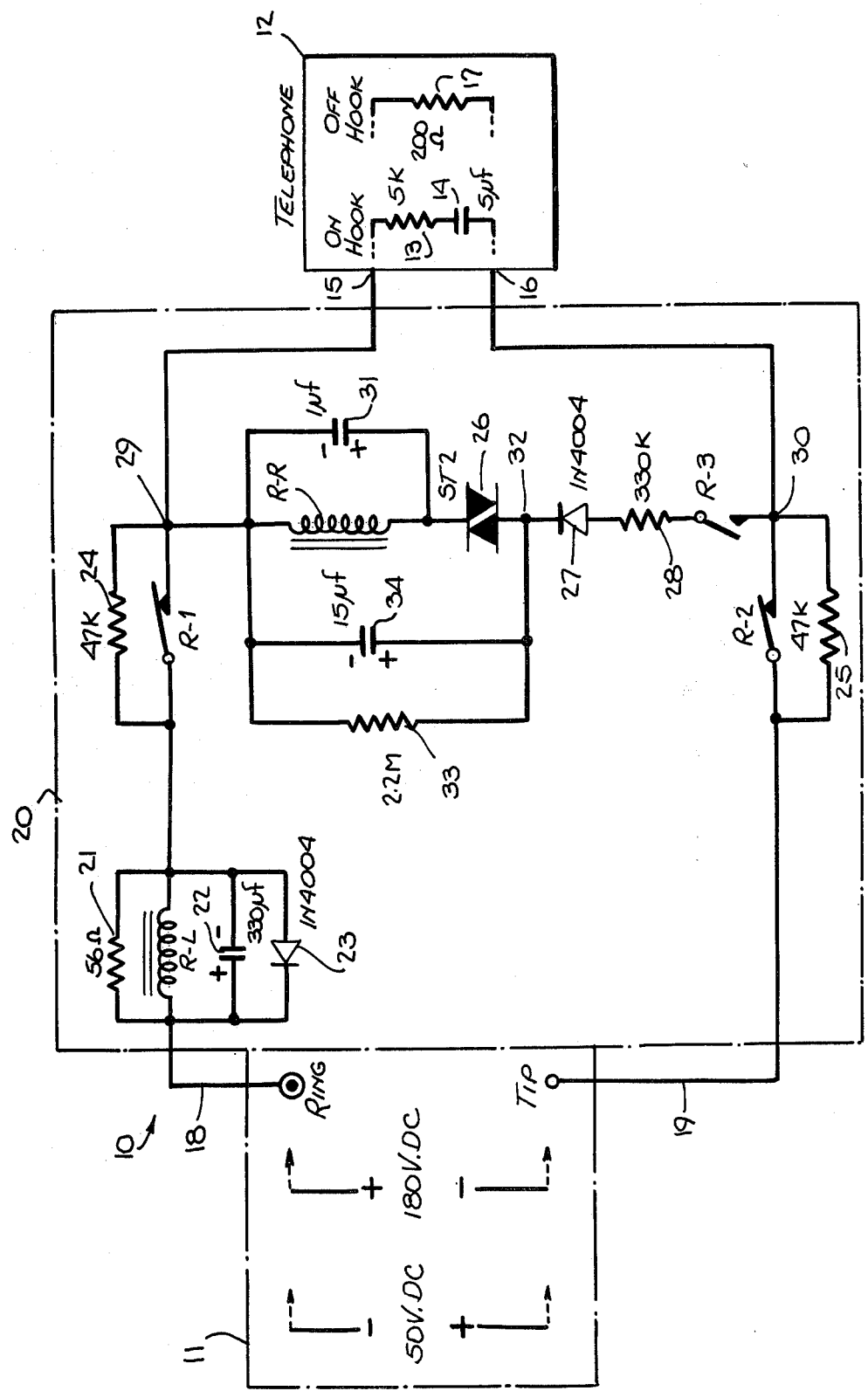

REMOTELY ACTUABLE LINE DISCONNECT DEVICE

BACKGROUND OF THE INVENTION

The present invention relates to communication loops and more particularly to the isolation of remote sections thereof to facilitate testing or enable correction of faults.

In wire communication systems involving subscriber equipment such as telephones or the like joined at the far end to wire loops that establish connection with a central office, it is often necessary to test the loops for faults. In order to confine test signals to the loop while eliminating interference from the subscriber equipment, it is necessary to disconnect the far end equipment from the loop, and such disconnection should be obtainable under remote control. Disconnection during testing is particularly important where privately owned equipment is connected to the lines of the communication system.

Another situation for which an isolation system is needed is that encountered in telephone party-line operation. An OFF-HOOK condition of the instrument belonging to one party interrupts service to all other parties. Only if the central office can disconnect any instrument found in an OFF-HOOK condition can the network be restored to operating condition.

Remote isolation devices currently available will respond to a signal voltage applied by automatic testing equipment (e.g., 180 volts DC) when the line under test is accessed. However, there are some serious problems with the devices currently in use. Many of the new switching systems use voltages for two party automatic number identification features, and other class mark testing that may cause trouble or provide the means to cause false operation of the remote isolation device. Generally, the known devices have their control circuits connected between one or both sides of the loop and ground and such systems are extremely susceptible to unwanted operation resulting from externally induced transients. The known systems tend to be complicated and costly to produce and not fully compatible with all existing communication networks.

It, therefore, is an object of the present invention to provide a remotely actuatable disconnect device for isolating the far end equipment from a communication loop, which device will not noticeably load the loop, will not disconnect telephone instruments in a normal ON-HOOK condition, is comparatively simple and inexpensive to produce, and avoids the disadvantages mentioned above.

SUMMARY OF THE INVENTION

In accordance with the invention there is provided a line disconnect device for insertion in a two-wire communication loop near the far end of said loop and operable from the near end of said loop to isolate said far end of said loop and any equipment connected to said far end of the said loop, wherein said equipment has at least one operating mode in which the impedance reflected into said loop by said equipment is conductive for direct current and of relatively low value, and another mode in which for direct current said impedance is at least substantially higher, said device comprising in combination first means insertable in series with one of said two wires and including second means actuable only in response to current of one polarity in excess of a given magnitude for altering its condition from a first to a second state; third means under the control of said second means and insertable in series with said two wires for disconnecting said far end of said loop whenever said second means is in said second state, and fourth means under the control of said second means and arranged for connection across said two-wire loop whenever said second means is in said second state, said fourth means being responsive to current of opposite polarity to said one polarity for restoring said second means to said first state.

BRIEF DESCRIPTION OF THE DRAWINGS

The invention will be better understood after reading the following detailed description of the presently preferred embodiment thereof with reference to the appended drawing in which the sole FIGURE is an electrical schematic of the disconnect device installed in a telephone line.

DETAILED DESCRIPTION OF THE PREFERRED EMBODIMENT

Referring to the drawing there is illustrated in schematic form a typical two-wire telephone line or loop 10 interconnecting the central office 11 with a telephone instrument 12. As shown, the telephone instrument 12 is of known construction such that an AC impedance approximately equivalent to a 5K resistor 13 in series with a 5 $\mu f$ of capacitor 14 appears across the telephone terminals 15 and 16 in the ON-HOOK condition or mode. When the telephone 12 is OFF-HOOK the effective impedance across terminals 15 and 16 is approximately equivalent to a 200 ohm resistor 17.

The communication loop 10 consists of a RING line 18 and a TIP line 19, and the disconnect device 20 is inserted therein at the far end generally close to the usual lightning arrestor block (not shown) at the subscriber location.

Disconnect device 20 includes a disconnecting relay of the latching type having a set or latching winding R-L and a resetting or unlatching winding R-R, and three contacts R-1, R-2 and R-3. Winding R-L and normally closed contacts R-1 are connected in series for insertion in series with one side of the loop 10, here illustrated as the RING side 18. Connected in parallel with winding R-L is a 56 ohm resistor 21, a 330 $\mu f$, 16 V. DC capacitor 22, polarized as shown, and a semiconductor diode or unidirectional conducting device 23. The diode 23 may be a type 1N4004 having a forward conduction volt drop of about 0.7 volts. A shunt resistor 24 of 47K ohms is connected across relay contacts R-1, as shown.

In order to balance the loop and insure disconnection, the relay contacts R-2, normally closed, in shunt with a 47k ohm resistor 25, are connected in series with the other side of loop 10, namely with TIP line 19.

The winding R-R is connected across the loop 10 in series with a diac 26, a semiconductor diode 27, a resistor 28 and contacts R-3 from a junction 29 in line 18 to a junction 30 in line 19. The winding R-R is shunted by a capacitor 31, polarized as shown, having a capacitance of 1 $\mu f$. Connected in parallel with the series combination of winding R-R and diac 26 between junction 29 and a junction 32 is a 2.2M ohm resistor 33 and a 15 $\mu f$ capacitor 34, the latter being polarized as shown. Diode 27 may be a type 1N4004, the same as diode 23, while resistor 28 has a resistance of about 330K ohms.

Under normal operation 50 V. DC battery voltage is applied at the central office 11 between RING and TIP with the RING negative and the TIP positive. Assuming a properly operating loop, the relay contacts R-3 will be open and contacts R-1 and R-2 will be closed. If the telephone 12 is in its ON-HOOK mode the capacitor 14 will block any steady state current flow. If instrument 12 is altered to the OFF-HOOK mode, the substitution of the low resistance 17 will permit battery current to traverse the loop for normal line and dial tone acquisition. Diode 23 will be conductive and will limit the volt drop across winding R-L to about 0.7 volts, too low a voltage to activate winding R-L. The combined AC impedance of resistor 21, winding R-L, capacitor 22 and diode 23 is extremely low for normal voice frequency signals as well as for ringing current, the latter usually ranging between 16 and 60 Hertz. Thus, the device 20 has little or no impact on normal circuit operation.

However, if the telephone 12 should remain in the OFF-HOOK mode after a central office disconnect such as to activate the central office trouble indication, not shown, a test voltage of about 180 V. DC, having reversed polarity to the normal battery voltage, is connected between TIP and RING. A loop circuit is now completed through winding R-L, closed contacts R-1, low resistance 17, and closed contacts R-2 back to the central office. A significant current will flow, initially charging capacitor 22 in the direction shown in the drawing and then energizing winding R-L sufficiently to open contacts R-1 and R-2 while closing contacts R-3. The charge stored in capacitor 22 will discharge through winding R-L after the contacts R-1 and R-2 commence to open, and such discharge will insure that the relay contacts open fully and that the relay shifts to its latched condition.

With the relay in its latched condition, contacts R-3 are closed but diode 27 prevents current flow when RING line 18 is positive with respect to TIP line 19. In addition, resistors 24 and 25 are now in series in the loop providing a loop termination for testing of at least about 94K ohms.

After testing, whenever it is determined at the central office 11 that normal operation can be restored to the loop 10, normal battery of 50 V. DC is reapplied with TIP positive and RING negative. If the telephone 12 is still OFF-HOOK the low resistance 17 bridges junctions 29 and 30 preventing energization of the network including unlatching winding R-R. That is, since resistors 24 and 25 are still in the circuit, no more than 0.1 volts will appear between points 29 and 30. But as soon as the telephone 12 is restored to ON-HOOK, the capacitor 14 will quickly charge, causing a significant increase in voltage between points 29 and 30, and current will commence flowing through the circuit consisting of resistor 25, junction 30, contacts R-3, resistor 28, diode 27, capacitor 34 (resistor 33 can be ignored for the present), junction 29, resistor 24 and diode 23 (components 21 and 22 and winding R-L can be ignored), back to the central office 11. At some later instant determined by the time constant of capacitor 34 and resistors 24, 25 and 28, the charge stored in capacitor 34 will provide a voltage across diac 26 exceeding its breakdown potential and causing it to conduct. Current will now flow through capacitor 31, developing a charge thereon and current will flow through winding R-R. The voltage drop across R-R will now be sufficient to energize the same, causing contacts R-3 to re-open and contacts R-1 and R-2 to re-close. The charge on capacitor 31 performs the same function as the charge on capacitor 22 and insures that the relay becomes reset and that all its contacts are restored to their starting condition.

Diac 26 can be a type ST2 having a breakdown potential ranging from 28 to 32 volts. Resistor 33 bleeds any residual charge from capacitor 34 to ensure that the time delay between restoration of normal battery and/or restoration of normal telephone conditions and release of the relay is consistent and to prevent undesired resetting resulting from transients entering the loop.

It was assumed above that the normal battery was restored before the telephone 12 went ON-HOOK. Therefore, the device 20 did not reset until ON-HOOK occurred. If, however, ON-HOOK occurs first, then reconnection will occur as soon as normal battery is restored.

Reviewing the foregoing description, the line disconnect device 20 has a first means, the elements 21, 22 and 23, along with a second means, the winding R-L of the latching relay, that is insertable in series with one of the two wires making up the communication loop. Because of diode 23 the winding R-L, and thus the relay, is actuable only in response to current of one polarity in excess of a given magnitude for altering its condition from a first to a second state. The contacts R-1 and R-2 constitute third means under the control of the winding R-L that are insertable in series with the two wires 18 and 19 for disconnecting the far end of the loop 10 whenever the relay is in its latched condition. The circuit including contacts R-3 constitutes fourth means under the control of winding R-L arranged for connection across the two-wire loop whenever the relay is latched. The fourth means, due to diode 27, is responsive only to current of opposite polarity to the normal battery current.

Having described the presently preferred embodiment of the instant invention it should be apparent to those skilled in the subject art that numerous changes in construction can be introduced without departing from the true spirit of the invention as defined in the appended claims.

What is claimed is:

1. A line disconnect device for insertion in a two-wire communication loop near the far end of said loop and operable from the near end of said loop to isolate said far end of said loop and any equipment connected to said far end of the said loop, wherein said equipment has at least one operating mode in which the impedance reflected into said loop by said equipment is conductive for direct current and of relatively low value, and another mode in which for direct current said impedance is at least substantially higher, said device comprising in combination first means insertable in series with one of said two wires and including second means actuable only in response to current of one polarity in excess of a given magnitude for altering its condition from a first to a second state; third means under the control of said second means and insertable in series with said two wires for disconnecting said far end of said loop whenever said second means is in said second state, and fourth means under the control of said second means and arranged for connection across said two-wire loop whenever said second means is in said second state, said fourth means being responsive to current of opposite polarity to said one polarity for restoring said second means to said first state.

2. A line disconnect device according to claim 1, characterized in that said fourth means comprises an unlatching winding of a latching relay, and charge storage means coupled to said unlatching winding for storing sufficient charge supplied from said near end of said loop to actuate said unlatching winding in the presence of voltage dropping impedance in said loop between said fourth means and said near end.

3. A line disconnect device according to claim 2, characterized in that said charge storage means comprises a first capacitor connected in parallel with said unlatching winding, a diac connected in series with said unlatching winding, and a second capacitor connected in parallel with said unlatching winding and diac in series.

4. A line disconnect device according to claim 3, characterized in that a unidirectional conducting device is connected in series with the parallel-series connection of said unlatching winding, first and second capacitors and diac.

5. A line disconnect device according to claim 4, characterized in that said latching relay includes a normally open contact, which contact is connected in series with the combination of said unlatching winding, capacitors, diac and unidirectional device for normally isolating said combination from said communication loop.

6. A line disconnect device according to claim 5, characterized in that said latching relay includes a latching winding, and said second means comprises said latching winding.

7. A line disconnect device according to claim 6, characterized in that a second unidirectional conducting device is connected in parallel with said latching winding and poled in the same direction as said first unidirectional device for current traversing said communication loop.

8. A line disconnect device according to claim 1, characterized in that said first means has a low AC impedance to the AC communication signals normally handled by said communication loop.

9. A line disconnect device according to claim 1, wherein said communication loop includes a subscriber line from a telephone central office to a subscriber, characterized in that said first means has an AC impedance for both ringing and voice frequencies that is sufficiently low that insertion of said first means in the line does not interfere with normal communication.

10. A line disconnect device according to claim 9, characterized in that said first means comprises a capacitor in parallel with said second means where said second means comprises a latching winding of a latching relay.

11. A line disconnect device according to claim 10, characterized in that voltage limiting means are connected in shunt with said latching winding for preventing actuation of said second means by normal battery current in said communication loop.

12. A line disconnect device according to claim 1, characterized in that said equipment when in said another mode couples to said communication loop an AC impedance substantially greater in magnitude than said conductive impedance, said AC impedance, when said equipment is in said another mode, preventing the flow of direct current and thereby preventing disconnection of said far end of said loop.

* * * * *